June 16, 1931. F. MACDONALD ET AL 1,810,181

PROCESS AND APPARATUS FOR RECOVERING VALUES FROM BRINE

Filed Sept. 29, 1928 2 Sheets-Sheet 1

June 16, 1931. F. MACDONALD ET AL 1,810,181
PROCESS AND APPARATUS FOR RECOVERING VALUES FROM BRINE
Filed Sept. 29, 1928 2 Sheets-Sheet 2

Patented June 16, 1931

1,810,181

UNITED STATES PATENT OFFICE

FRANCIS MACDONALD, WILLIAM H. ALLEN, CHARLES F. RITCHIE, AND VINCENT T. MANCHEE, OF TRONA, CALIFORNIA, ASSIGNORS TO AMERICAN POTASH & CHEMICAL CORPORATION, OF NEW YORK, N. Y., A CORPORATION OF DELAWARE

PROCESS AND APPARATUS FOR RECOVERING VALUES FROM BRINE

Application filed September 29, 1928. Serial No. 309,279.

This invention relates to a process and apparatus for recovering values from brine and has particular reference to brines naturally occurring in arid regions, resulting from the solar evaporation of former lakes. The most outstanding of such lakes are saline deposits at Searles Lake and Owens Lake in California. The invention is equally useful as applied to synthetic brines originating from the solution of mixed salt deposits of like origin or to other synthetic brines of similar composition.

The present invention is of especial value for the evaporation and manipulation of brine containing carbonates, sulphates, chlorides and borates of sodium and potassium, as well as for general use in the evaporation of solutions which deposit salts upon evaporation and which are subject to decomposition when heated for excessive periods of time.

The invention is especially useful for the evaporation of Searles Lake brine. Searles Lake brine has the following percentage composition as delivered from the crystal body at 22.5° C.:

| | | |
|---|---|---|
| Sodium chloride | NaCl | 16.50 |
| Sodium sulfate | Na$_2$SO$_4$ | 6.82 |
| Potassium chloride | KCl | 4.82 |
| Sodium carbonate | Na$_2$CO$_3$ | 4.80 |
| Sodium borate | Na$_2$B$_4$O$_7$ | 1.51 |
| Lithium chloride | LiCl | 0.021 |
| Sodium phosphate | Na$_3$PO$_4$ | 0.155 |
| Unreported | ? | 0.154 |
| Water | H$_2$O | 65.22 |
| Total percentage | | 100.00 |

When a saline solution of this or similar composition saturated with sodium chloride, sulphate and carbonate is heated, even prior to evaporation, a double salt or mixed crystal of sodium carbonate and sodium sulphate is precipitated. This double salt possesses what is known as an invert solubility curve, i. e., it is less soluble hot than cold. The formation of this mixed crystal by virtue of heating and evaporation renders the utilization of the ordinary or conventional type of evaporating equipment inefficient and entirely unsuited to the problem of large scale evaporation of such brines. As Searles Lake and similar brines are evaporated, the mixed crystal, sodium sulphate-carbonate, is the first precipitated and continues to be deposited together with sodium chloride throughout the process of evaporation. Finally, as the brine reaches the later stages of concentration, sodium carbonate monohydrate may be precipitated.

The composition of the mixed crystal sodium carbonate-sulphate is not exact, its composition depending upon the concentration of the components in the brine. While in general, the composition of this salt may be set forth by the formula,

$$2Na_2CO_3 \cdot 3Na_2SO_4,$$

the ratio of sulphate to carbonate varies to a certain extent. In brines having a large excess of sodium carbonate over and above that required to combine with the sodium sulphate to form the mixed crystal, there will occur upon concentration, a precipitation of sodium carbonate. Such an excess of sodium carbonate exists in the natural brines of Searles Lake and Owens Lake of California. Because of the somewhat indefinite character of this mixed crystal and for the sake of brevity, we have hereafter used the term "sodium-carbonates," intending to include under such term both pure sodium carbonate and any mixed crystal carbonate. The sodium carbonates, i. e. the pure salt and the mixed crystals, are similar in thermodynamic behavior and are precipitated in the process of the present invention as crystals of like size. It will later be pointed out that the process of the present invention produces sodium chloride, in crystals of large size and the sodium carbonates in crystals of small size, and the separation of these ingredients to a material extent is made to take place by a process of hydraulic classification.

In the concentration of brines, it often happens that small quantities of minor impurities constitute a considerable nuisance in the evaporators. Calcium sulphate is an example of this in the table salt industry. Although relatively insoluble, it forms a scale upon the heating surfaces by virtue of its invert solubility characteristics, which materially decreases the transmission of heat. From the foregoing analysis of Searles Lake brine, it will appear that there are small quantities of lithium chloride and sodium phosphate present. During concentration, especially at elevated temperatures, a lithium-sodium phosphate is precipitated, and this material may have a profound effect upon the heat transmission in the conventional type of evaporator; forming an adherent, non-conducting scale upon the heating elements.

It is customary to concentrate Searles Lake and similar brines to the point of saturation with potash, at the temperature employed in the final stage of evaporation. During this evaporation, sodium chloride and the sodium carbonates are largely precipitated while the concentration of the sodium borates is materially increased in the liquor. In the process of evaporation, especially at elevated temperatures, there is a tendency for sodium tetraborate to react with sodium carbonate according to the equation:

This decomposition is very undesirable. In the first place, it produces sodium metaborate, an unmarketable salt from sodium tetraborate, a valuable salt.

Secondly, the carbon dioxide gas produced is undesirable as it comixes with the vapors passing from the boiling liquid and forms a non-condensable gas in the steam belts of the heaters in the multiple effect evaporating unit. We have found that the extent to which the above reaction proceeds is dependent largely upon the time of retention of the brine at elevated temperatures.

The main object of the present invention is to provide an economical, simple and practical means and method for the continuous evaporation of brines, such as are found in Searles Lake, on a large scale and for the simultaneous separation of the several components precipitating during this evaporation.

More specifically, an object of the present invention is to provide a means and apparatus for the evaporation of brines such as are found in Searles Lake with sufficient rapidity and under proper conditions, to prevent substantial conversion of the tetraborate of sodium into the metaborate of sodium during the process.

The conventional type of evaporator has been found to be entirely unsuited to the service of concentrating brines such as are found in Searles Lake. By the "conventional type of evaporator", we refer to the type of evaporator having its heating units enclosed within the shell provided for evaporation.

In such installations, the liquor circulation is usually obtained by thermal effects, sometimes promoted to a certain extent, by paddles or like means. When employed on Searles Lake brines, such an evaporator quickly salts up its heating tubes, as well as other parts of the pan. It has been found that evaporation from such pans is very slow. It has also been found that heat transfer drops so materially due to the scaling or salting up, that it becomes advisable, after relatively short periods of operation, to shut down and remove the scale from the evaporator. In this type of evaporator, the entire unit must be emptied of liquor, fresh water pumped in and the salt removed by the slow process of unagitated or slightly agitated dissolution. Such shutdowns, especially when operating on a large scale, are extremely expensive, reducing the overall efficiency of the process markedly.

It is an object of the present invention, therefore, to provide a means and apparatus for evaporating brines in which the evaporation of water from the brine shall be induced at a point entirely removed from the place of heat transfer.

It is a further object of the present invention to provide a plurality of heating units apart from the evaporator proper for heating the brine during evaporation, which heating units are so arranged as to facilitate washing, repairing, or inspection of one or more of the several aforementioned units without materially affecting the continuous operation of the evaporating unit as a whole.

Another object of the present invention is to provide a means and method for evaporating brines in which there is a rapid, continuous circulation of brine and suspended salts through the passages of external heaters in such a manner as to insure a high rate of heat transfer from the steam to the brine and at the same time, to inhibit by a certain degree of scouring or other action, the rapid deposition of scale upon the heating surfaces, thereby obtaining a prolonged period of good heat transfer.

It is a further object of the present invention to provide a method and apparatus for concentrating brine in which the brine may be heated externally to the evaporating pans to temperatures materially above the boiling temperatures of the brine at the pressure maintained in the evaporating pan, (i. e., provided with a high degree of super-heat) and to provide a simple and effective means of introducing such highly superheated brine into the body of the evaporators in such manner as to avoid excessive foaming or bumping of the brine in the evaporating pans.

The process and apparatus for recovering values from brine forming the subject matter of the present invention, will be more readily understood from a description of the preferred form or example of a process and apparatus for recovering values from brine embodying the invention.

For this purpose, there is hereafter described with reference to the accompanying drawings, a preferred form or example of an apparatus embodying the invention.

Figure 1:
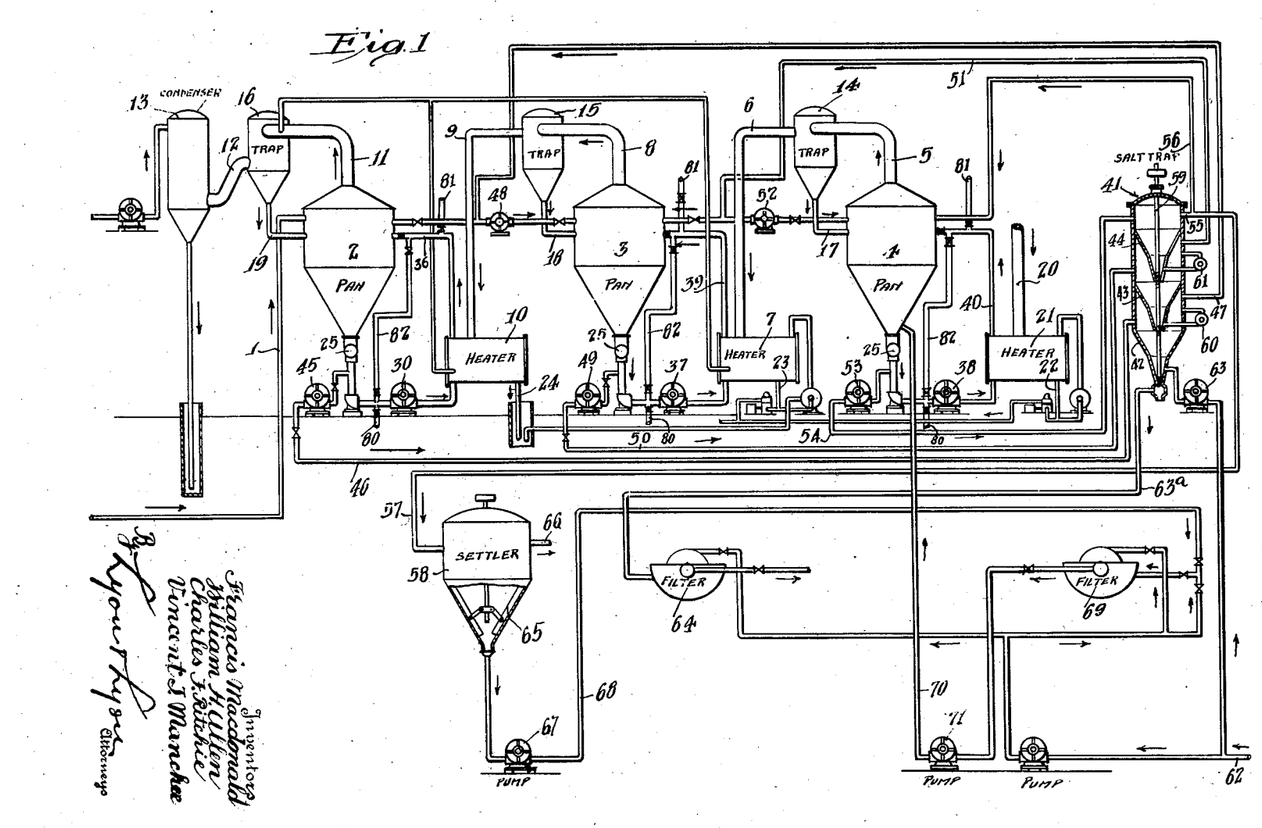
Figure 1 is a diagrammatic elevation of an apparatus embodying the invention.

Referring to the drawings:

2, 3 and 4 constitute the pans or evaporators of a triple effect evaporating unit which are of the usual type fitted with conical sections at the bottom and conical or dome tops.

Vapors lines 5 and 6 connect the upper cone of the first effect pan 4 with the steam chest of an external heater 7, serving the second effect pan 3. Similarly, the upper cone of the second effect pan 3 is connected by vapor lines 8 and 9 with the steam chest of external heater 10 serving the third effect pan 2. The upper cone of the third effect pan is connected by vapor lines 11 and 12 with the standard barometric condenser 13 which serves to condense the steam leaving the third effect pan, thereby producing the vacuum required within the system.

Mist separators 14 and 15 and 16 are interposed in the vapor lines for the purpose of separating entrained liquor from the vapors and returning the same to the evaporator pans. These mist separators are shown as provided with lines 17, 18 and 19 respectively, leading back to the pans 4, 3, 2 respectively. Line 20 delivers steam preferably which has been passed through a prime mover, to the steam chest of an external heater 21 serving the first effect pan 4. Lines 22, 23 and 24 serve to remove condensates from the heaters continuously from whence it is conducted to the boiler system or to other appropriate places throughout the plant.

An important feature of the present invention is the construction and arrangement of the external heaters 21, 7 and 10. While in Figure 1 of the drawings, a single heater is shown connected with each pan, in the preferred form of the invention, a plurality of heaters of duplicate construction are provided for each pan, and Figures 2 and 3 indicate the construction of such heaters and their connections with the pans.

Figure 2:
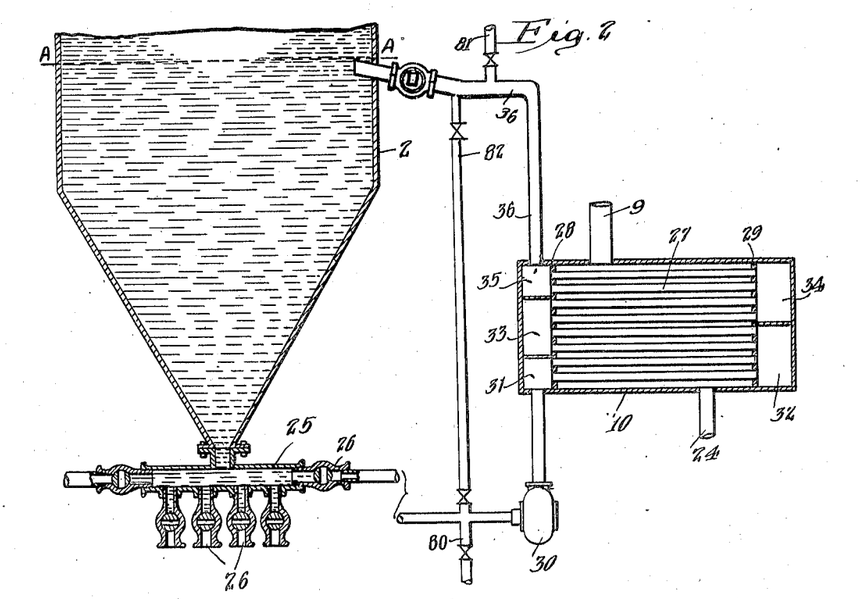
Figure 2 is an enlarged fragmentary elevation showing the manifold heater construction.
Figure 3:
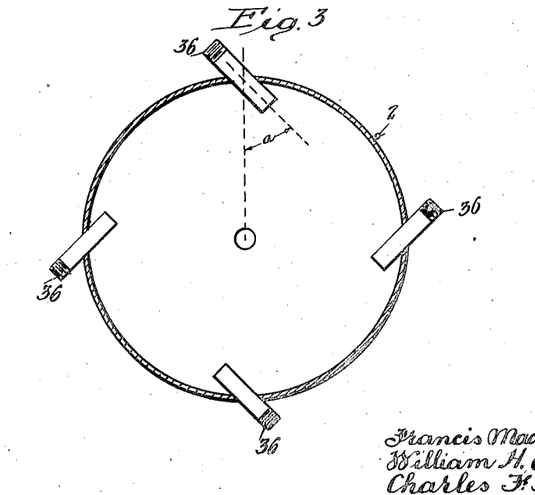
Figure 3 is a section through one of the evaporators, showing the direction of discharge of the inlets from the heaters.

A plurality of such heaters is employed in order that the apparatus and process as a whole may be conducted continuously while one or more of the heaters is removed from the system, for the purpose of cleaning out the heater when desired. As illustrated in Figures 2 and 3, each evaporator pan, for example, evaporator pan 2 at its lower end connects with a manifold 25 which has a plurality of plug cock controlled discharge nipples 26. The heaters 10 are provided, preferably four or more in number, each connecting with the manifold 25 through a separate plug cock 26.

The heaters 10 are of duplicate construction and consist, for example, of a bank of tubes 27 between headers 28 and 29.

The brine removed from the pan 2 is drawn through one of the plug cocks 26 by a pump 30 and discharged into a chamber 31 at one end of the bank of tubes, flows through the bank of tubes to a chamber 32 at the other end of the bank of tubes, and is there directed back through a further portion of the bank of tubes 27 into the chamber 33, passing then back through further tubes in the heat exchanger to the chamber 34, and finally, out through chamber 35 and line 36 to the evaporator pan 2.

The heater is thus one in which the brine is caused to pass in poly-passes back and forth. The steam which enters the heater 10 through 9, for example, crosses crosswise through the tubes, and if desired, the steam chest of the heater may be baffled.

In Figure 3 there is indicated four inlet pipes for discharging brine from the heater into the evaporator pan 2. The brine in practice, is delivered from a pipe which is disposed to discharge the brine slightly upwardly, as indicated in Figure 2. The discharge pipes are so arranged as to form a substantial angle, $a$, between the line of flow and the intersecting radius of the pan. By this arrangement the force of the entering stream rotates the contents of the pan.

In order to provide a means of washing out the heaters, the heaters are each provided with a drain 80 near their pumps 30, 37 and 38. There is also provided vents 81 in the return lines 36, 39 and 40, and by pass lines 82 connecting return lines 36, 39 and 40 with the pumps 30, 37 and 38 respectively. When it is desired to wash out a heater, the heater is disconnected from the pan by plug cock 26 and plug cock on line 36, 39 or 40, the drain 80 is opened and also the vent valve 81. The brine is then drained or pumped from the heater through the drain line, a suitable washout medium, e. g. water, is injected into the heater and circulated by pump 30, 37 or 38, through the heater and the by-pass line 82. The water is then drained from the heater and the liquor replaced.

37 and 38 respectively indicate pumps for circulating brine from the pans 3 and 4 through the heaters 7 and 21 back through lines 39 and 40 into the pans 3 and 4. It is understood that the pans 3 and 4 are, in practice, equipped with a plurality of such heaters, pumps and circulation lines and that the circulation lines are caused to enter the heaters in a manner similar to those described in connection with pan 2.

Raw brine, i. e. brine as pumped from Searles Lake, or a mixture of raw brine and end liquors resulting from crystallization of potash and borax from previously concentrated brine, together with other end liquors and wash waters of value collected throughout the process, are continuously conducted through line 1 into the evaporator pan 2. This liquor is superheated by being circulated through external heaters 10 and partially evaporated upon its return to evaporator 2.

During this heating and evaporation, salt is precipitated from the brine. Due to the violent ebullition within the pans combined with the steeply sloping sides of the cone bottom, no salts are settled or concentrated within the pans themselves. In this respect the present invention departs materially from past practice, which has universally found it desirable to concentrate the precipitated salts in the lower portions of the pans. It is one of the novel features of this invention to maintain a fairly high concentration of suspended solids in the pans and in the liquor which is circulated through the heaters. By the combination of this feature with the design of the heaters, it is possible to maintain a high rate of heat transfer over prolonged periods of time.

Another feature possessed by the process and apparatus of this invention is the control over the size of the crystals produced during evaporation.

The salts which are precipitated during evaporation in the process and apparatus of the present invention are continuously separated from the brine in passing through a multiple cone settler trap 41, which is preferably formed by a cylindrical shell and three conical bottoms, spaced apart, forming three superimposed cones 42, 43 and 44. The salt-laden liquor from the pan 2 is drawn by a pump 45, connecting with one of the plug cocks of the manifold of effect 2, and passed through a line 46 into the lower cone 42 of the salt trap 41.

This salt-laden liquor passes over or across the top of cone 42, is withdrawn through line 47, and passed partially back into the pan 2 and partially into the pan 3 by means of a pump 48. Similarly, the salt-laden liquor in pan 3 is withdrawn by a pump 49 and passed through a line 50 to the second cone 43 of the salt trap 41, and caused to pass over said cone, as described above. From the cone 43, the partially settled liquor is withdrawn through the line 51 and passed partially back into the pan 3, and partially into the pan 4 by means of the pump 52. The salt-laden liquor from pan 4 is withdrawn by means of pump 53 and passed through a line 54 to the upper cone 44 across which it flows and is withdrawn and passed by line 55 partially through line 56 back into pan 4 and partially through line 57 into a clarifier or settling cone 58.

Evaporation of the brine takes place in all three pans simultaneously and in the usual manner of triple effect, counter current evaporation practice. As evaporation and concentration proceed, the brine or liquor in the first effect pan 4, reaches saturation with potassium chlorid and is ready for removal from the evaporation system. The process of this invention is entirely continuous. Finished liquor is continuously removed from the first effect pan 4, at elevated temperatures and sent to the settler 58 for final clarification. Pan feed is continuously supplied to the third effect pan, as previously stated, in quantities sufficient to compensate for the evaporation and continuous removal of liquid.

Partially concentrated liquor is transferred forward from pan 2 to pan 3 and from pan 3 to pan 4 at such a rate as to maintain a constant predetermined level in all the pans. In the operation of the improved system of this invention it has been found somewhat advantageous to advance the clear liquor, that is the liquor having the least coarse salt in suspension.

The liquors are withdrawn from appropriate pans, and passed to the cone settlers 42, 43 and 44, flowing over these settling cones at a rate which permits the settling of the greater part of the coarse salts formed in the process, while at sufficient rate to prevent the fine salts from being settled out. As a result, the fine salts are substantially all removed from the salt trap 41 with the liquor outflowing by lines 47, 51 and 55.

The salt trap 41 is indicated as provided with a central rotating shaft 59 which has screw threads at the orifices of the cones and operates as a means for forcibly ejecting hard lumps of salt from the orifices.

As the salt passes through the bottom section of each cone it is continuously washed free of the liquor accompanying the salt in order that this liquor will not become lost. The preferred method and means of accomplishing this is by providing suitable pumps 60 and 61 for passing liquor from the lower effect cones to the upper cones of the series to displace the liquor from the salt of the upper cones, by the liquor of the lower cones.

The coarse salt passes successively through each cone being counter-washed in each step with the more dilute liquor from the preceding cone and is finally discharged from the orifice of the lower cone 42. Here it is washed by raw brine supplied from the line 62 under pressure of a pump 63. A salt sludge is removed from the salt trap 41 through the line 63ᵃ wet now for the most part with raw brine and passed to a continuous filter 64, on which the salt is substantially separated from the accompanying brine, the brine so separated being passed to line 1, if desired.

The operation of the salt trap causes the fines to remain with the liquor returned to the pans not only due to the high rate of flow of the liquor through the pans, but also by the aid of the counter-washing streams of brine admitted at the orifices of the cones. These streams of brine elutriate the fines from the mixtures of coarse and fine salts, causing the finer crystals to be carried out with the brine and returned to the pans.

In the settler 58 the fine salts produced in the process are permitted to settle and are prevented from adhering to the sides by rotating paddles 65. The solution overflows and is passed out through line 66, which leads to further apparatuses and processes employed for recovering the potash and borax contents of the hot concentrated brine.

The fine salts settling in settler 58 are removed as a sludge by pump 67, and passed through a line 68 to a continuous filter 69 on which they are separated from the solution and washed with raw brine from line 62. The filtrate may be passed through a line 70 by a pump 71, back into the first effect 4 of the evaporator system.

The above described apparatus and process are especially useful for large scale evaporation of saline solutions containing relatively small quantities of valuable products amenable to concentration.

In the special case of Searles Lake brine, the analysis of which appears above, it is evident that it is necessary to eliminate nearly five parts of salts, such as sodium chloride and the sodium carbonates in the evaporator, traps, etc. for every unit of potash and borax concentrated. It is also necessary to remove ten parts of water for every unit of valuable constituents concentrated. To one skilled in the art, it is apparent that commercial processes for recovering values from such brines are limited to very narrow margins of profit, and if such ventures are to succeed, the details of the design, construction and arrangement of the equipment must embody the maximum efficiency as regards initial installation costs, as well as operation and maintenance costs. It is equally requisite that the process itself secure the most desirable results with the least expenditure of labor, power, etc.

The brine in the pans 2, 3 and 4 precipitates, as before explained, a mixed crystal of sodium sulfate and sodium carbonate upon heating and evaporation. This salt deposits as a hard glass-like scale upon the heating surfaces of the tubes 27 of the heaters. It is found that this deposit takes place very rapidly in quiescent liquor zones and that the scale so deposited is a very poor conductor of heat. The conventional type of evaporator has been found to be entirely unsuited to the service of concentrating such brines.

With the apparatus of the present invention, it is possible to disconnect one of the external heaters of each pan whenever it is necessary to remove scale and to wash the same and return it to operation without materially affecting the operation of the triple effect evaporator unit as a whole.

Another advantage of the heater arrangement of the present invention is the accessibility afforded. In the case of the conventional type of evaporator, in which the heater unit is inside of the evaporator it is necessary to completely shut down the entire triple effect unit to repair a single faulty tube. Whereas, with the apparatus and process of the present invention one of the heaters of an evaporator may be repaired without shutting down the evaporator pan or the whole triple effect evaporator.

An important feature of the present invention resides in the use of such heat exchangers external to the evaporator pans, as are capable of imparting to the brine circulated through the heat exchangers, a temperature sufficiently high that the brine, when ejected back into the evaporator pans, will be at a high degree of superheat. It has been found economical and advantageous, for example, to have this superheat as high as 12 to 20° F.

Other important features of the present invention are the provision of a method and apparatus in which a high circulating rate is maintained through the heat exchangers, in combination with a method and apparatus in which a very material quantity of precipitated salts is caused to pass with the circulating stream, through the heat exchangers. By circulating with the brine to be superheated, material quantities of suspended salts, these salts operate to reduce the scale formation in the heaters by scraping the deposits therefrom.

The circulation of salt through the heaters also is beneficial in reducing the formation of scale since the precipitating salts offer a more suitable growth or deposition medium than the tubes of the heaters. This holds true for the carbonate scale as well as for the lithium-phosphate scale.

We have found that by circulating such brines containing a material quantity of suspended salts through the heat exchangers at rates varying between 2 and 6 feet per second, the heat exchangers may be operated for relatively long periods of time without having to be shut down for the removal of scale.

In the practice of the process and apparatus of the present invention, the sludge which is circulated through the heat exchangers normally contains about 5% suspended salts.

Another feature of the present invention is that the process and apparatus for evaporating the brine is so conducted as to bring about the precipitation of sodium chlorid as crystals of relatively large size, simultaneously causing the precipitation of the sodium carbonates as crystals of relatively small size. High temperature and rapid concentration are usually factors resulting in the precipitation of crystals of small size, however, the small sized crystals of sodium chlorid formed in the process are repeatedly recirculated through the process until the sodium chlorid crystals finally grow to large size. It is also thought that the fine crystals of sodium chlorid passing back from the traps to the pans are redissolved when subjected to the high degree of superheat within the heaters, and consequently form as large crystals upon the relatively small number of sodium chlorid nuclei present in the pan. In this manner the large crystals of sodium chlorid are assured.

Another important feature of the process and apparatus of the present invention resides in the employment of plug cocks used for connecting the plurality of external heaters with the pans, in place of the ordinary large gate valves commonly employed in this service. Due to the excessive quantity of salt being handled in the liquor and being continuously eliminated from the concentrating brine, coupled with the tendency of this salt to precipitate upon heating, ordinary gate valves accumulate a firm and extensive coating of salt in a short time. It is frequently, or usually impossible to close completely a valve in such condition. An attempt to close such a valve in a badly salted condition often results in material damage.

In order to surely and safely accomplish this it is necessary to inject large quantities of fresh water into the seat, bonnet, etc. in order to loosen and to dissolve the deposited salt. This water, often amounting to 3000 gallons for a single large valve, must of necessity go into the pan with the liquor. It is apparent that heat must be expended to evaporate this water, constituting an enormous economic waste and materially reducing the output of the evaporating unit. This very undesirable feature of the old-type system has been entirely eliminated by the use of a lubricated plug cock; absolutely no water being used in the operation of this type of cut-off in the improved process of this invention.

The inherent construction of this type of cut-off exposes only a small area subject to salting or cementation, therefore only mild force is required to move the valve even after prolonged operation. The seat of the valve is never exposed to the brine, hence a perfect shut-off is always assured. When it is noted that there are 24 or more large valves supplied to each triple effect evaporator unit for the purpose of disconnecting the heaters from the pans, the importance of this improved system will become apparent.

In the process and apparatus of the present invention, brine is maintained in the several pans at a level somewhat above the point of introduction of the brine from the circulating streams. As example for operating conditions, 1,000,000 gallons of brine per hour are circulated through the heaters and discharged into each of the pans, the pans are generally of capacity of about 30,000 gallons. Pans of this size will permit the circulating streams to change the contents of each pan about every two minutes. The introduction of such large volumes of highly superheated liquor into a relatively small space constitutes a problem of considerable magnitude if violent splashing, bumping, and foaming are to be eliminated.

If the terminals of the circulation lines from the heaters are directed into the pans diametrically, either in a horizontal plane or at an angle thereto, violent splashing, bumping, and foaming ensue. Such action causes the loss of concentrated liquor; splashing it into the condenser or into the steam chests of the succeeding heaters.

Since pure condensate is valuable and necessary for the operation of the boiler plant, splashing in excess of reasonable separator capacity is very undesirable. By introducing the liquor tangentially, i. e., at an angle inclined to the diameter and with a slightly upward tilt, at points equidistant about the circumference of the pan, as shown in Figures 2 and 3, violent splashing and bumping, so hazardous to life and property, are entirely eliminated, and losses of liquor and spoilage of condensate are reduced practically to zero.

Brines of the natural alkaline lakes invariably contain a small amount of organic matter. This material causes the brine to foam during concentration in the multiple effect evaporators. By injecting the circulating streams from the heaters into the evaporator pans in a tangential direction, a circular motion of the liquid within the pan is obtained, of such magnitude that an appreciable vortex or hollow cone of liquor is created. The action of this vortex is such that it entraps and destroys the rising column of foam before it has reached any considerable height.

In many instances, the device of this improved process has been found sufficient to entirely control foaming; in other cases, the excellent means of foam control specified in United States Letters Patent No. 1,591,725 has been found a satisfactory complement to the device of this improved process and apparatus.

While it is the object of the polypass external heaters to impart a large degree of superheat to the brine, it is imperative that ebullition does not take place within the heater tubes or within the delivery pipes 36, 39 and 40. The high degree of super-heat described throughout this specification is requisite for the optimum efficiency of operation and also for the production of desired crystal sizes.

By constructing the evaporator pans 2, 3 and 4 with vertical cylindrical sections of considerable height above the liquor inlets, sufficient hydrostatic head is imposed above the plane A—A, Figure 2 to successfully prevent ebullition within the inlet pipes and within the heaters.

The slight upward tilt imposed upon the terminals of the circulating streams directs the hot incoming liquid to the surface of the liquor within the pans. This serves to prevent the hot incoming liquor from passing directly to the bottom of the pan, where it would cause violent bumping, as well as increasing the temperature of the feed to the heaters. If the hot liquid from the heaters is short circuited to the bottom of the pans, the temperature differential between the steam and brine is reduced and the heat transfer is also reduced.

As before described, the porcess of concentrating and evaporating the brine in the apparatus and the process of the present invention, results in the precipitation of sodium chlorid and sodium carbonates. While these products are considered less valuable than the constituents remaining in the brine after concentration, they possess, nevertheless, a certain intrinsic value if separated and rendered to a fair state of purity. The value of sodium chlorid or common salt is well known. The sodium carbonates may be converted into soda-ash, caustic soda and like products. Since all these salts represent products of relatively low market value, it is paramount that means for recovering, separating and purifying them must be simple and efficient. By the process of concentrating brine with the apparatus of the present invention, these salts are separated in large quantities by hydraulic classification. For this purpose, it is necessary that the crystals of sodium chlorid produced in the process be materially larger than the crystals of the carbonates produced.

Throughout the arrangement and design of the present process of this invention those factors influencing the production of crystals of differential size have been given special consideration; for this feature of the invention is of great importance. Rapid evaporation and concentration of the brine normally results in the production of fine crystals. Inasmuch as rapid evaporation is prerequisite in the process of the present invention and prerequisite to preventing decomposition of sodium tetraborate into the metaborate, special means must be provided in order that the sodium chlorid will be obtained as large crystals.

In the process and apparatus of the present invention, at their inception, the individual crystals of sodium chlorid and of the sodium carbonates are of small size. The process and apparatus of this invention are so designed as to take advantage of the greater tendency of the sodium chlorid crystals to grow to a relatively large size, while the sodium carbonates under a given treatment remain as fine crystals, throughout the process. The salt removing steps and apparatus of the present invention are so designed as to remove salts from the evaporator system only when they have grown to a large size, while liquid from the salt traps containing the small crystals is continuously fed back into the different pans where small crystals of sodium chlorid can be subjected to further growth.

Under the conditions of the method and apparatus of the present invention, therefore, any fine crystals of sodium chlorid become materially enlarged, while the crystals of the sodium carbonates carry through the process as fines. Therefore, the salt withdrawn from the bottom of the trap 41 as a sludge, and recovered on the filter 64, is to a large extent, free from the carbonates, while the salt contained in the sludge removed from the bottom of the settler 58 and separated on the filter 69, is largely composed of the sodium carbonates.

While the method and apparatus for concentrating brines and separating salts therefrom herein described, are well adapted for carrying out the objects of the present invention, it is understood that various modifications may be made without departing from the principles of the invention, and that this invention includes all such modifications and changes as come within the scope of the appended claims.

We claim:

1. A process of evaporating brine while precipitating salt therefrom which comprises, circulating the brine from an evaporator to an external heater, back into the evaporator, and super-heating the brine in the heater to a high degree of super-heat.

2. A process of evaporating brine while precipitating salts therefrom which comprises, circulating the brine from an evaporator to an external heater and back into the evaporator, raising the brine in the heater to a high degree of super-heat, and continuously withdrawing the brine from the evaporator with the precipitated salts in suspension.

3. A process of evaporating brine while precipitating salts therefrom which comprises, circulating the brine from an evaporator through a heating zone and back into the evaporator, and super-heating the brine 12 to 20° F. in the heating zone.

4. A process of evaporating brine while precipitating salts therefrom which comprises, circulating the brine from an evaporator through a heating zone and back into said evaporator, the circulating stream of brine, passing through said heating zone, having a material quantity of salts in suspension.

5. A process of evaporating brine while precipitating salts therefrom which comprises, circulating the brine through a heating zone and back into said evaporator, the brine containing a material quantity of suspended salts, and heating the brine in said heating zone to a high degree of super-heat.

6. A process of evaporating brine while precipitating salts therefrom which comprises, circulating the brine from an evaporating zone through a heating zone and back into said evaporating zone, and directing the entering stream of brine from the heating zone into the evaporating zone at a substantial angle to the intersecting radius of the evaporating zone.

7. A process of evaporating brine to precipitate salts therefrom which comprises, circulating the brine from an evaporating zone through the heating zone and back into said evaporating zone, and introducing the returning circulating stream of brine into said evaporating zone to create a vortex or hollow cone of liquid in said evaporating zone.

8. A process of evaporating brine while precipitating salts therefrom which comprises, circulating the brine from an evaporator through a heating zone and back into said evaporating zone, the relation of velocity of circulation to volume of liquid maintained in said evaporating zone being equivalent to effecting a change of the content of the evaporating zone every few minutes.

9. A process of evaporating brine while precipitating salts therefrom which comprises, circulating the brine from an evaporator through a heating zone and back into said evaporating zone, the circulating stream of brine containing a material quantity of suspended salts, the circulating stream of brine passing through the heating zone at a high velocity, and heating the circulating stream of brine to a high degree of super-heat in the said heating zone.

10. A process of evaporating brine while precipitating salts therefrom, which comprises, circulating the brine from an evaporating zone through a heating zone and back into said evaporating zone below the level of liquid maintained therein, and directing the returning stream of brine in the said evaporating zone in a direction at a substantial angle to the intersecting radius of the evaporating zone whereby to maintain the liquid in the evaporating zone in the form of a vortex or hollow cone of liquid.

11. A process of evaporating brine while precipitating salts therefrom which comprises, passing the brine successively through a plurality of evaporating zones, circulating the brine from each evaporating zone through an external heating zone and back into said evaporating zone, the circulating streams of brine containing material quantities of suspended salt, and continuously separating from the liquid, undergoing evaporation in said evaporating zones, salt crystals.

12. A process of evaporating brine while precipitating salts therefrom which comprises, continuously passing the brine successively through a plurality of evaporating zones, circulating brine from each evaporating zone through a heating zone and back into said evaporating zone, withdrawing a sludge of brine and precipitated salts from at least one of said evaporating zones, removing salts from said sludge, and returning the brine to one of said evaporating zones.

13. A process of evaporating brine while precipitating salts therefrom which comprises, passing the brine through a plurality of evaporating zones, circulating brine from said evaporating zone through a heating zone and back into said evaporating zone, the streams of circulating brine containing material quantities of suspended salts, continuously withdrawing brine from the evaporating zone, removing suspended salts from said brine, and returning brine partially to the evaporating zone from which it is withdrawn and partially to a succeeding evaporating zone of the process.

14. A process of evaporating brine while precipitating salts therefrom which comprises, circulating brine from an evaporating zone in a plurality of parallel circulating streams through parallel heating zones and back into said evaporating zone, the circulating streams of brine containing material quantities of suspended salts, and continuously withdrawing a sludge of brine and salt from said evaporating zone.

15. A process of evaporating brine while precipitating salts therefrom which comprises, passing the brine successively through a plurality of evaporating zones in which the brine is successively evaporated and caused to precipitate salts, passing the brine from each evaporating zone through an external heating zone and back into said evaporating zone, withdrawing a sludge of brine and precipitated salts, removing coarse salts from the same, and returning brine containing fine salts in suspension to said evaporating zones.

16. A process of evaporating brine while precipitating salts therefrom which comprises, passing the brine to a plurality of evaporating zones in which the brine is successively evaporated and caused to precipitate solids, passing the brine from each evaporating zone into a heating zone and back into said evaporating zone, heating the brine in said heating zones to a high degree of superheat, the brine passing through the heating zones at relatively high velocity and containing material quantities of suspended salt, the returning streams of brine entering the evaporating zones in such manner as to prevent excessive splashing, and bumping of the evaporating brine in said evaporating zones, removing from said evaporating zones sludges of brine and salt crystals, separating salts from said sludges and returning the brine to the evaporating zones.

17. An apparatus for evaporating brine while precipitating salts therefrom which comprises, an evaporator, means for circulating brine from the evaporator through a heating zone and back into said evaporator, such heating zone, and means for directing the entering stream of brine from the heater zone into the evaporator at a substantial angle to the intersecting radius of the evaporator at the point of entry.

18. An apparatus for evaporating brine to precipitate salts therefrom which comprises, an evaporator, a heater, means for circulating brine from the evaporator through the heater and back into the evaporator, and means for introducing the returning stream of brine into the evaporator in such manner as to create a vortex or hollow cone of liquor in said evaporator.

19. An apparatus for evaporating brine while precipitating salt therefrom which comprises, an evaporator, means for circulating brine from said evaporator through a heating zone and back into said evaporator, such heating zone, and a discharge terminal on the circulating stream operative for discharging the brine into the evaporator at an angle to the intersecting radius of the evaporator at the point of entry and in a slightly upward direction.

20. An apparatus for evaporating brine while precipitating salts therefrom which comprises, an evaporator, an external polypass heater for said evaporator, and means for circulating brine from said evaporator through said heater and back into said evaporator.

21. An apparatus for evaporating brine while precipitating salts therefrom which comprises, an evaporator, a plurality of external heaters, a manifold connected to the lower end of said evaporator and having plug cock controlled lines leading to said external heaters, and plug cock controlled lines connecting said external heaters back to said evaporator.

22. An apparatus for evaporating brine while precipitating salts therefrom which comprises, an evaporator, a plurality of external heaters, a manifold connected to the lower end of said evaporator and having plug cock controlled lines leading to said external heaters, and plug cock controlled lines connecting said external heaters back to said evaporator, the returning lines from said heaters entering the evaporator at circumferentially spaced apart points.

23. An apparatus for evaporating brine while precipitating salts therefrom which comprises, an evaporator, a plurality of external heaters, a manifold connected to the lower end of said evaporator and having plug cock controlled lines leading to said external heaters, and plug cock controlled lines connecting said external heaters back to said evaporator, the returning lines from said heaters entering the evaporator at circumferentially spaced apart points, and at a substantial angle to the intersecting radius of the evaporator at said points.

Signed at Trona, California, this 19th day of September, 1928.

FRANCIS MACDONALD.
WILLIAM H. ALLEN.
CHARLES F. RITCHIE.
VINCENT T. MANCHEE.